United States Patent [19]

Jing-Lin

[11] Patent Number: 4,848,699
[45] Date of Patent: Jul. 18, 1989

[54] CAR-SHAPED VIDEO TAPE REWINDER

[76] Inventor: Long Jing-Lin, N. 53 Yih Yeong Rd., 80257 Lin Ya Dist, Kaohsiung, Taiwan

[21] Appl. No.: 158,557

[22] Filed: Feb. 22, 1988

[51] Int. Cl.⁴ .................. G03B 1/04; G11B 15/32
[52] U.S. Cl. .................... 242/201; 360/96.3; 360/96.5; D14/121
[58] Field of Search .............. 242/198, 201, 200; 360/96.3, 96.5, 132, 96.1, 96.6; 446/71, 72, 73; D14/1, 2, 6, 99

[56] References Cited
U.S. PATENT DOCUMENTS 4,154,810  7/1979  Hodkinson .............. 360/132 X
4,513,927  4/1985  Tsai ..................... 360/96.6 X Primary Examiner—David Werner
Assistant Examiner—John M. Eghtessad
Attorney, Agent, or Firm—Kirschstein, Ottinger, Israel & Schiffmiller

[57] ABSTRACT

A car-shaped video tape rewinder having a shape of a model car on whose chassis a tape rewinding system is mounted. A case body is raised up or down at the front for receiving a video tape to be rewound and for storing a cleaning tape. The rewinding system includes a motor and a set of gears engaging one another for revolving a main winding head and is mounted on a movable base elevated a little above the chassis by a positioning post. The movable base can be moved by the motor to open the case body and to cut off the electric power at the moment when rewinding has been finished. The rewinder is shaped to be decorated.

9 Claims, 4 Drawing Sheets

CAR-SHAPED VIDEO TAPE REWINDER

BACKGROUND OF THE INVENTION

Nowadays most video tape rewinders generally have one of two kinds of rewinding methods. One method is effected by a belt transmitting revolving movement from a motor to a winding head, while the other method employs a combination of gears. Opening the tape case is automatically opened by a switch, after rewinding a tape has been finished.

The two methods just mentioned have a few shortcomings in use; the belt transmitting method may not work accurately because of much looseness caused by excessive length of the belt or much tightness caused by a too short length of the belt, thereby causing breaking of the belt and the motor, falling off of the belt or idle revolving of the motor because of long use of the belt; the gear transmitting method involves rather complicated work in its assembling and consequently a high cost.

Besides, the two methods only perform the function of rewinding, so the tape case has to be opened by an additional opening device by means of indirect touching when rewinding the tape is finished. These separate devices for rewinding the tape and opening a tape case can cause a comparatively high cost and high percentage of malfunction. In addition, all video tape rewinders in the market never possess an additional value in their outward look, say a decorative value, so they are ordinarily stored at a hidden stop lest they should hinder the embellishing atmosphere of the room in a house. It may be said that a merchandise is a kind of waste if it can only be taken out for practical use from the hidden place and it is usually stored away. Its value can be increased if it is provided with a unique mechanical structure, a good simple usage and a new decorative look as well.

In view of the drawbacks in video tape rewinders mentioned above, this invention has been made to improve them by combining together the actions of rewinding a tape and opening a tape case and designing a decorative outward aspect as an additional value.

SUMMARY OF THE INVENTION

This car-shaped video tape rewinder is not only provided with a mechanical system both for rewinding a video tape and for automatically opening at the same time, but also is shaped as a model car which is constituted with a chassis, a body and a case body whose top part makes up the car top. The body includes the front part, the rear part and both side parts of this car; the body is assembled with the chassis only by means of four wheel shafts. The headlights can indicate that this rewinder is operating.

The rewinding function is performed by a motor and four gears engaging one another, revolving a main winding head sustained by a positioning post. These parts for rewinding are mounted on a movable base which is sustained a little above the chassis by the same positioning post set standing on the chassis. The movable base is provided with a pushing plate extending forward and the free end of the pushing plate touches one end of a case opening arm. When rewinding a tape has been finished and the main winding head can no more revolve, the movable base can be turned a little off its regular rewinding position with the positioning post as a pivot by the motor and then the pushing plate can push sidewise the case opening arm, which then can slantingly be moved to function to open the case body and to cut off the electric power to the motor.

So this rewinder not only has a practical value for rewinding a video tape, but a decorative value for adornment as well.

DETAILED DESCRIPTION OF THE PREFERRED EMBODIMENT

Figure 3:
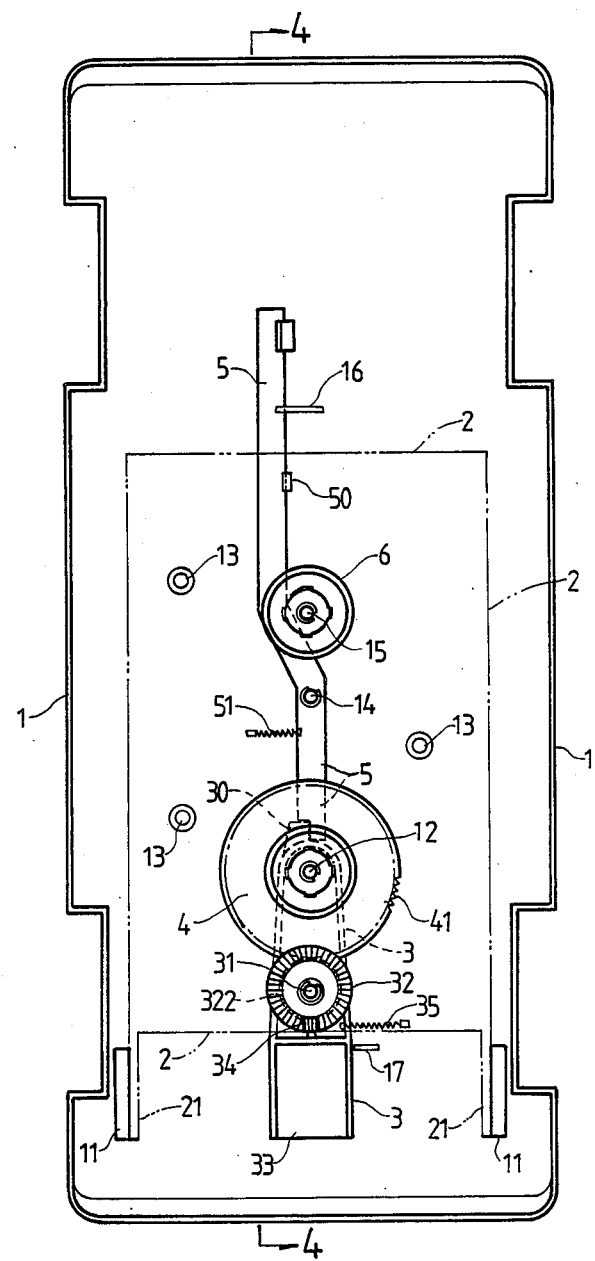
FIG. 3 is a plan view of the chassis assembled in accordance with the present invention.
Figure 4:
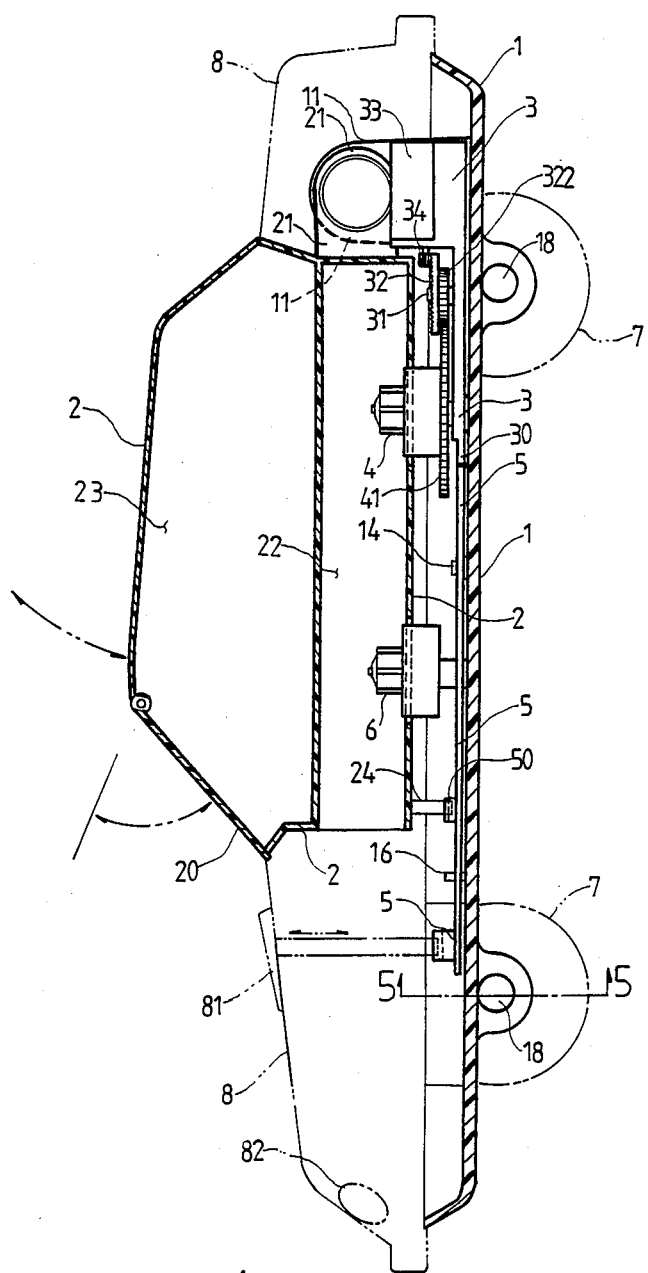
FIG. 4 is a cross-sectional view taken on line 4—4 of FIG. 3.
Figure 5:
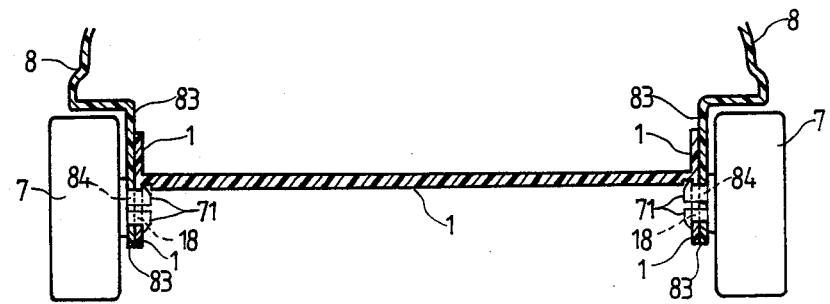
FIG. 5 is a view of the body and the chassis taken on line 5—5 of FIG. 4.

At first, this car-shaped video tape rewinder as shown in FIGS. 3 and 4 comprises a chassis 1, a case body 2, a movable base 3, a main winding head 4, a case opening arm 5, a second winding head 6, wheels 7, and a body 8 as its main parts.

There are two parallel supporting plates 11 fixedly spaced apart on the rear part of the chassis 1 for assembling the case body 2 in its position such that the case body 2 can be raised up and down at the front, but this construction is the same as is commonly known in the art is not further described here. A round positioning post 12 is provided on the chassis 1 in front of the two supporting plates 2, forming as a triangle with said plates 11 and used for setting the main winding head 4 and positioning the movable base 3. Guiding posts 13 are separately provided on the middle part and the front part of the chassis 1 for guiding the case body 2 lest the tape being rewound should tilt to one side. A pivot 14 for positioning the case opening arm 5 is set on the chassis 1 in the straight front of the positioning post 12 and another positioning post 15 is set on the chassis 1 in the straight front of the pivot 14 for positioning a second winding head 6, said posts 12, 15 and said pivot 14 being arranged on a straight line. Besides, a stopping plate 16 is set on the front part of the chassis 1 for keeping the case opening arm 5 in its regular position if said arm is moved back after having been moved off the regular position. Another stopping plate 17 is set on the rear part of the chassis 1 at a little offset between the two supporting plates 11 for keeping the movable base 3 in its regular position if said base 3 is moved back after having been moved off the regular position. Then a shaft hole 18 is separately provided at the under edge near each corner of the chassis 1 for fixing the shaft 71 of wheels 7 penetrating through it, said chassis 1 being assembled with the upper body 8 simultaneously by fixing said shafts 71 in position.

Next, the case body 2 is set in the whole seating space of this car-shaped rewinder, the two guiding plates 21 extending out of the rear end of the case body 2 are pivotally connected with the two supporting plates 11 on the chassis 11 so that the case body 2 can be raised up or down at the front for receiving or removing a tape. The case body 2 is divided into a lower room 22 and an upper room 23, said lower room 22 being used for placing a video tape to be rewound with the front side open, said upper room 23 being used for storing a cleaning tape with a front glass window 20 able to be opened. The bottom of the case body 2 is also provided with two holes for the main and the second winding heads 4, 6 to extend through upward.

Figure 1:
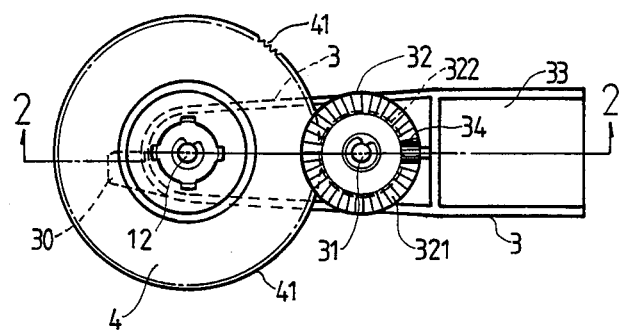
FIG. 1 is a top plan view of the movable base and the main winding head assembled together in accordance with the present invention.
Figure 2:
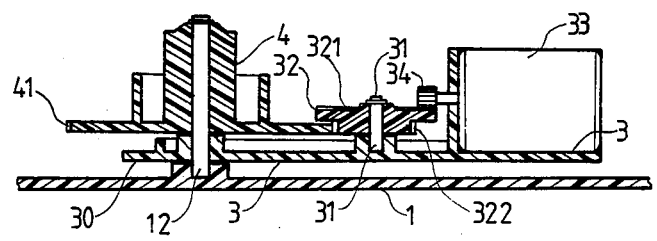
FIG. 2 is a cross-sectional view taken on line 2—2 of FIG. 1.

Next, the movable base 3 shown in FIGS. 1,2, and 3 is freely combined with the positioning post 12 with a hole provided in said base 3 for said post to insert through and maintain the base at a little elevation above the chassis 1, said post 12 being set standing on the chassis 1 and also positioning the main winding head 4 penetrating the center of said head 4. A transmitting gear disc 22 is set in its position with a shaft 31 vertically located on the central longitudinal line of the middle rear part of said base 3. A motor 33 is set behind the shaft 31 on the rear part of said base 3 revolving the gear disc 32 engaging with a first gear 34 fixed on the shaft of the motor 33, said gear disc 32 being provided with ring teeth 321 at its circumferential surface to engage with said first gear 34. A second gear 322 fixed under the gear disc 32 is adapted to engage with a gear wheel 41 which is set under the main winding head 4 moving said head 4 to revolve. The gear disc 32 and the second gear 322 have the same shaft. A return spring 35 is set on the chassis 1 to pull the movable base 3 back to its regular position against the stopping plate 17 while this rewinder is operating or not operating. However, the movable base 3 can be moved a little off the regular position with the positioning post 12 as a pivot by the revolution of the motor 33 when rewinding a tape has just been finished with the main winding head 4 impossible to revolve any more; at that moment the electricity for the motor 33 is to be cut off automatically causing said motor 33 to stop moving and then said return spring 35 can pull said base 3 just moved off its regular position back. The wire supplying electric power can be led into the car from the rear of the body or through the exhaust pipe.

The case opening arm 5 is freely positioned on the chassis 1 held by the supporting pivot 14, and the front part of said arm 5 is pulled to rest against the stopping plate 16 by a replacing spring 51, said spring 51 having one of its ends fixed on the chassis 1. Said arm 5 can commonly retain the case body 2 in the closed position or the rewinding position, but can be moved to open, i.e. to raise up, the case body 2 if said arm 5 is pushed to move side-wise by means of said pivot 14 when said movable base 3 is moved off its regular position causing the end of a pushing plate 3 set extending out of the front of said base 3 to push sidewise said arm 5. So the rear end of said arm 5 is always kept in touch with the end of the pushing plate 30 of said base 3, whether said base 3 is in the regular position or moved off said position. In addition, said arm 5 is provided with a hook 50 for hooking with a hooking bar 24 set under said case body 2 so that said case body 2 may be raised up with said hooking bar 24 leaving said hook 50 when said base 3 is moved off the regular position.

The body 8 includes the front part, the rear part and the right and left sides, but not the seating space or the top of the car. A push button 81 is set on the front cover for opening the case body 2 to place in a video tape for rewinding, and a headlight 82 is set as a signal light while this rewinder is being used. Combining plates 83 are set extending downward from both the front sides and the rear sides of the upper body 8 and each provided with a shaft hole 81 for a shaft 71 to insert through for assembling together the upper body 8 and the chassis 1. Said body 8 and chassis 1 can be easily assembled together by inserting said shafts 71 into said shaft holes 81 and also easily taken apart for repair in the same way if necessary.

Lastly, the usage, the function and the action of this rewinder are described below.

1. In using the rewinder, pressing down the push button 81 on the front cover of the body 8 raises the case body 2 up. Then a video tape rewound is to be put in the lower room 22. Next, pressing down said body 2 will rewind said tape, said movable base being in the regular position and the electric power being turned on to start the motor and said headlight 82 being lit to indicate rewinding in progress.

2. When rewinding has been finished, said movable base 3 would be moved a little off the regular position turned by the motor, the electric power turned off at the same time, said base 3 pushing said case opening arm 5 to move off its regular position so that said case body 2 might be raised up for the tape rewound to be removed from said lower room 22 and the headlight 82 might be shut off.

3. The upper room 23 in the case body 2 can be used for storing a cleaning tape or a video tape.

4. It does not take much space, while it possesses a decorative value.

5. In manufacturing this rewinder, inserting the four wheel shafts in their positions finishes the assembling of the body 8 and the chassis 1 together, so the process is quite simple and easy.

6. In repairing this rewinder, pulling out the four wheels 7 is enough to dismantle the body 8 from the chassis 1.

What is claimed is:

1. A tape cassette rewinder, comprising:
(A) a housing having a car-shaped configuration, including
  (i) a base resembling a car chassis,
  (ii) a lid resembling a car passenger compartment and pivotably mounted on the base for movement between a lid-open position in which a tape cassette is insertable into the housing, and a lid-closed position in which the tape cassette is contained within the housing, and
  (iii) a body resembling a car body and mounted on the base;
(B) a movable support member pivotably mounted on the base for movement about a pivot axis between a rewinding position and a rewind-stop position;
(C) drive means mounted on the support member for joint movement therewith, and operative for rewinding the tape cassette in the rewinding position of the support member, and for angularly moving the support member about the pivot axis to the rewind-stop position when the rewinding is completed, said drive means including
  (i) a rotary, main winding head engageable with the tape cassette in the lid-closed position,
  (ii) an electrically powered motor having an input shaft, and
  (iii) a gear transmission between the shaft and the head for rotating the head about the pivot axis; and
(D) lid-opener means for automatically opening the lid when the rewinding is completed, including
  (i) a hook mounted on the lid, and (ii) a movable swing arm pivotably mounted on the base and having a catch that is hookingly engaged by the hook in the rewinding position of the support member, (iii) said swing arm being moved by the support member during movement of the latter to the rewind-stop position, for disengaging the catch from the hook, and for releasing the lid for movement to the lid-open position.

2. The rewinder as recited in claim 1, wherein the gear transmission includes a drive gear on the shaft and rotatable about a generally horizontal axis that extends along the shaft, a gear wheel connected to the head for rotation therewith about the pivot axis, and an intermediate gear having a first gear section in meshing engagement with the drive gear, and a second gear section in meshing engagement with the gear wheel, said intermediate gear being rotatable about a generally vertical axis parallel to said pivot axis.

3. The rewinder as recited in claim 1, wherein the support member is elongated and has a pushing projection at one end region thereof, and wherein the swing arm is elongated and has a receiving recess at one end region thereof, said pushing projection being at least partly received in the receiving recess.

4. The rewinder as recited in claim 1; and further comprising abutment means against which the support member engages to define the rewinding position, and also comprising return means for automatically returning the support member from the rewind-stop position to the rewinding position after the rewinding is completed.

5. The rewinder as recited in claim 4; and further comprising means for engaging the swing arm to define an initial position when the support member is in the rewinding position; and also comprising means for automatically restoring the swing arm to its initial position after being moved by the support member.

6. The rewinder as recited in claim 1, wherein the lid includes an upper storage chamber, and a lower storage chamber in which the tape cassette is received, said lower storage chamber having an opening through which the head extends.

7. The rewinder as recited in claim 1, wherein the base is generally rectangular and has four corners, and has a wheel at each corner for supporting the housing.

8. The rewinder as recited in claim 7, wherein the base has a depending peripheral flange having a clearance hole at each corner; and wherein the body has a depending peripheral skirt having a plurality of alignment holes, each aligned with a respective clearance hole when the body is mounted on the base; and wherein each wheel has an axle insertable with snap-type action in and through a respective pair of aligned holes.

9. The rewinder as recited in claim 1, wherein the housing has at least one headlight which is illuminated during rewinding.

* * * * *